US008175445B2

(12) United States Patent
Morrison et al.

(10) Patent No.: US 8,175,445 B2
(45) Date of Patent: May 8, 2012

(54) BUNDLED LOAD CORNER EDGE PROTECTOR CUTTING SYSTEM

(75) Inventors: Arland L. Morrison, Port Barrington, IL (US); Richard K. Balling, Cary, IL (US); Richard G. Newman, Burlington, WI (US); Michael W. Potempa, Libertyville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 393 days.

(21) Appl. No.: 12/478,238

(22) Filed: Jun. 4, 2009

(65) Prior Publication Data

US 2010/0040353 A1 Feb. 18, 2010

Related U.S. Application Data

(60) Provisional application No. 61/089,604, filed on Aug. 18, 2008.

(51) Int. Cl.
*A47J 27/00* (2006.01)
*F24H 3/02* (2006.01)

(52) U.S. Cl. ........................................ 392/382; 392/379

(58) Field of Classification Search ........... 392/379–385
See application file for complete search history.

(56) References Cited

U.S. PATENT DOCUMENTS

| | | | | |
|---|---|---|---|---|
| 3,381,443 | A * | 5/1968 | Copping | 53/442 |
| 4,238,663 | A | 12/1980 | Calhoun et al. | |
| 4,535,224 | A * | 8/1985 | Westerman, Jr. | 392/382 |
| 5,394,505 | A * | 2/1995 | Bidare | 392/379 |
| 2004/0237735 | A1 | 12/2004 | Diem | |
| 2010/0040353 | A1* | 2/2010 | Morrison et al. | 392/382 |

FOREIGN PATENT DOCUMENTS

| | | |
|---|---|---|
| GB | 163422 | 5/1921 |
| GB | 556374 | 10/1943 |

OTHER PUBLICATIONS

International Search Report for PCT/US2009/050229 dated Sep. 1, 2009.

* cited by examiner

*Primary Examiner* — Daniel L Robinson
(74) *Attorney, Agent, or Firm* — Levenfeld Pearlstein, LLC

(57) ABSTRACT

A non-contact cutter for a polymer corner protector disposed on a load includes an air manifold having an inlet and an outlet and defining an air passage and a heating element disposed at least in part in the air passage. A compressed gas is communicated to the manifold and into the air passage for intimate contact with the heating element to heat the gas. The heated gas is discharged through the outlet to contact and soften the polymer corner protector at a desired location to separate the corner protector at the desired location. A system and method for non-contact cutting are disclosed.

20 Claims, 8 Drawing Sheets

BUNDLED LOAD CORNER EDGE PROTECTOR CUTTING SYSTEM

CROSS-REFERENCE TO RELATED APPLICATION DATA

This application claims the benefit of priority of provisional U.S. Patent application Ser. No. 61/089,604, filed Aug. 18, 2008.

BACKGROUND OF THE INVENTION

The present invention relates to a cutter for edge protectors for bulk loads. More particularly, the present invention relates to a non-contact cutter for edge protectors that are used on large loads, such a bricks and masonry.

Typically, large loads such as bricks packaged as a plurality of stacked individual units formed into a 3-dimensional bundle. The bundle typically includes corner protectors that extend along the edges of the bundle and straps that encircle the load and the corner protectors. The corner protectors are elongated angle members that fit onto the corner of the load. One know corner protector is the BladeRunner™ edge protector commercially available from ITW Signode of Glenview, Ill. The corner protectors can be, for example, formed as a 2 inch by 2 inch wide, poly element having a thickness of about 0.014 to about 0.036 inches (about 14 to 36 mils) and are typically provided in roll form having a length of about 1000 to about 3000 feet.

During the bundling process, the corner elements are often required to be cut to conform to the size of the load. To effect this cut, the protectors are perforated (transverse to the length) and the protector is pulled or torn to separate the protector portion on the load from the remaining portion. This has its drawbacks. In particular, if the protector does not separate readily the bundle can be pulled over or the protector can be pulled from the load. Both of these situations are preferably avoided.

Accordingly, there is a need for a cutter for the edge protector. Desirably, such a cutter is a non-contact cutter. More desirably, such a cutter is automatically actuated and can cut known corner protectors in a manner that does not compromise the integrity of the protector element or potentially affect the stability of the load.

BRIEF SUMMARY OF THE INVENTION

A non-contact cutter for a polymer corner protector disposed on a load includes an air manifold having an inlet and an outlet and defining an air passage and a heating element disposed at least in part in the air passage. A compressed gas, such as air, is communicated to the manifold and into the air passage for intimate contact with the heating element to heat the gas. The heated gas is discharged through the outlet to contact and soften the polymer corner protector at a desired location to separate the corner protector at the desired location.

In one embodiment, the non-contact cutter includes a housing having a heating element disposed therein. The air manifold is disposed at least in part in the housing. The housing can have a generally L-shaped body having a back and a leg. In such an arrangement, the heating element is disposed at least in part in the back and leg, and the air passage includes a portion configured to direct air to the back and leg for intimate contact with the heating element.

A preferred heater is an electric heater. Alternately, the heater can be a ceramic heater.

The cutter can be disposed in a head and such that the head is movable toward and away from the polymer corner protector. The head can be mounted to a carriage and operably mounted to a rail for linear movement toward and away from the corner protector. Alternately, the head can be mounted for pivotal movement toward and away from the corner protector.

A system and method for non-contact cutting are also disclosed.

These and other features and advantages of the present invention will be readily apparent from the following detailed description, in conjunction with the claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
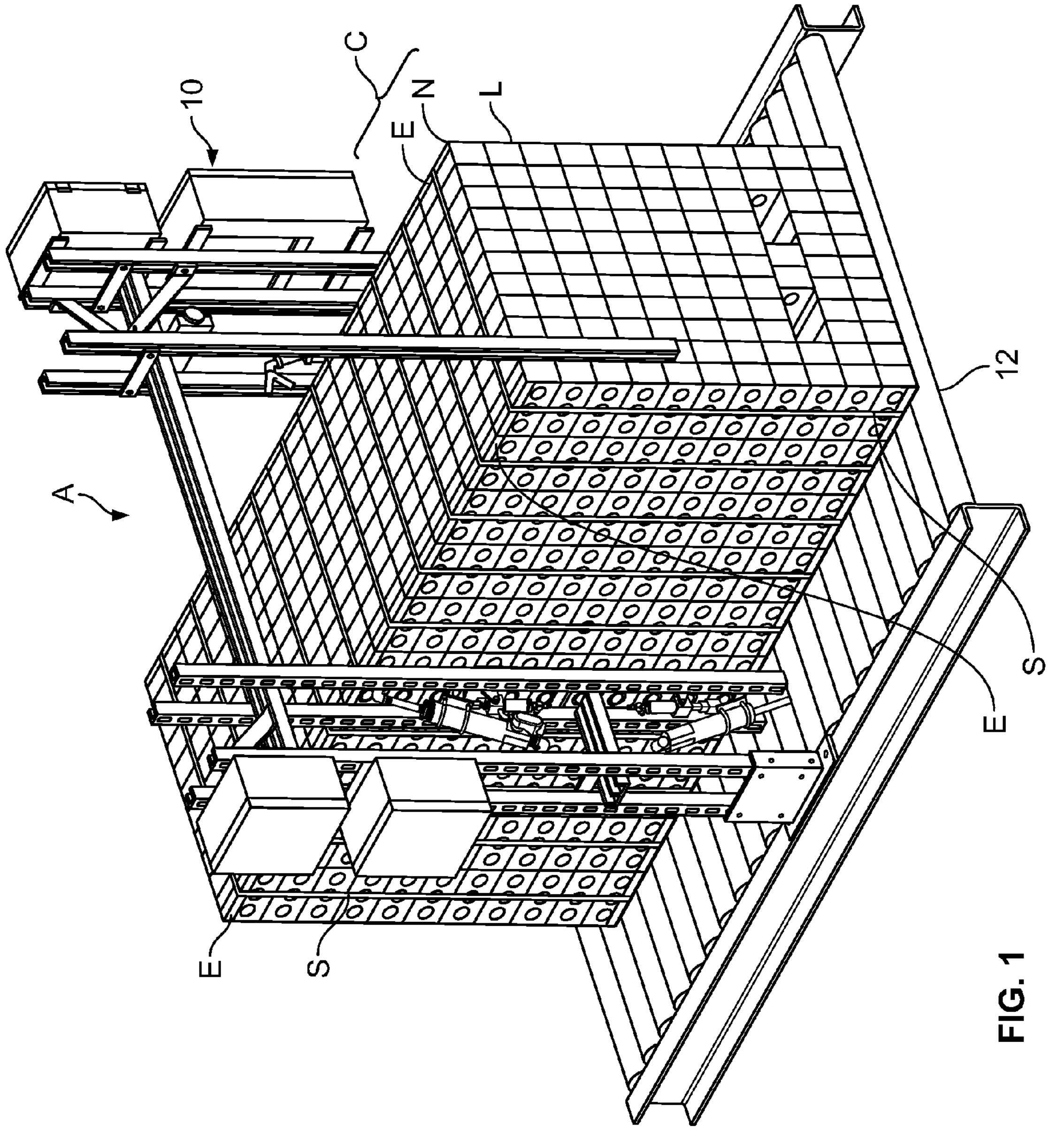
FIG. 1 is a perspective view of load of bricks in a bundling apparatus showing an embodiment of a corner edge protector cutting system embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIG. 1, there is shown a bundled load of bricks L on a bundling apparatus A having an embodiment of a corner edge protector cutting system 10 in accordance with the principles of the present invention. The bundling apparatus A includes a strapping section (not shown) at which strapping material S is positioned around the load L and the corner edge protectors E. The load L is conveyed though the bundling apparatus A on a conveyor 12.

In order to separate the load L into separate sections C, the corner edge protectors E must be cut. The corner edge protector cutting system 10 includes a frame 14 having multiple cutting heads 16*a-d* positioned on the frame 14.

In a present system, four cutting heads 16*a-d*, one positioned at each corner of the load L, are positioned on the frame 14. The frame 14 essentially forms an arch 18 over the conveyor 12. The frame 14 and the location of the heads 16*a-d* on the frame 14 are all adjustable to accommodate different conveyor widths $w_{12}$ and heights $h_{12}$ and load L widths $w_L$ and heights $h_L$.

Each head 16*a-d* includes a heat torch 20 for cutting the edge protector E material. The heat torch 20 includes electric controls 22 and pneumatic controls 24. A present heat torch 20 heats air using a ceramic heating element (not shown). In a present torch 20, the heating element is a 4250 watt ceramic heating element. The heat torch 20 discharges the heated air to an angled nozzle 26 that conforms to the corner N of the load L (that is, a 90 degree angled nozzle 26). The nozzle 26 includes a series of openings or holes 27 on the underside 28 through which the heated air passes. Air is blown through the inside 29 of the torch 20 where it is heated to about 1200 deg. F. after which the air passes through the nozzles 26.

Figure 2:
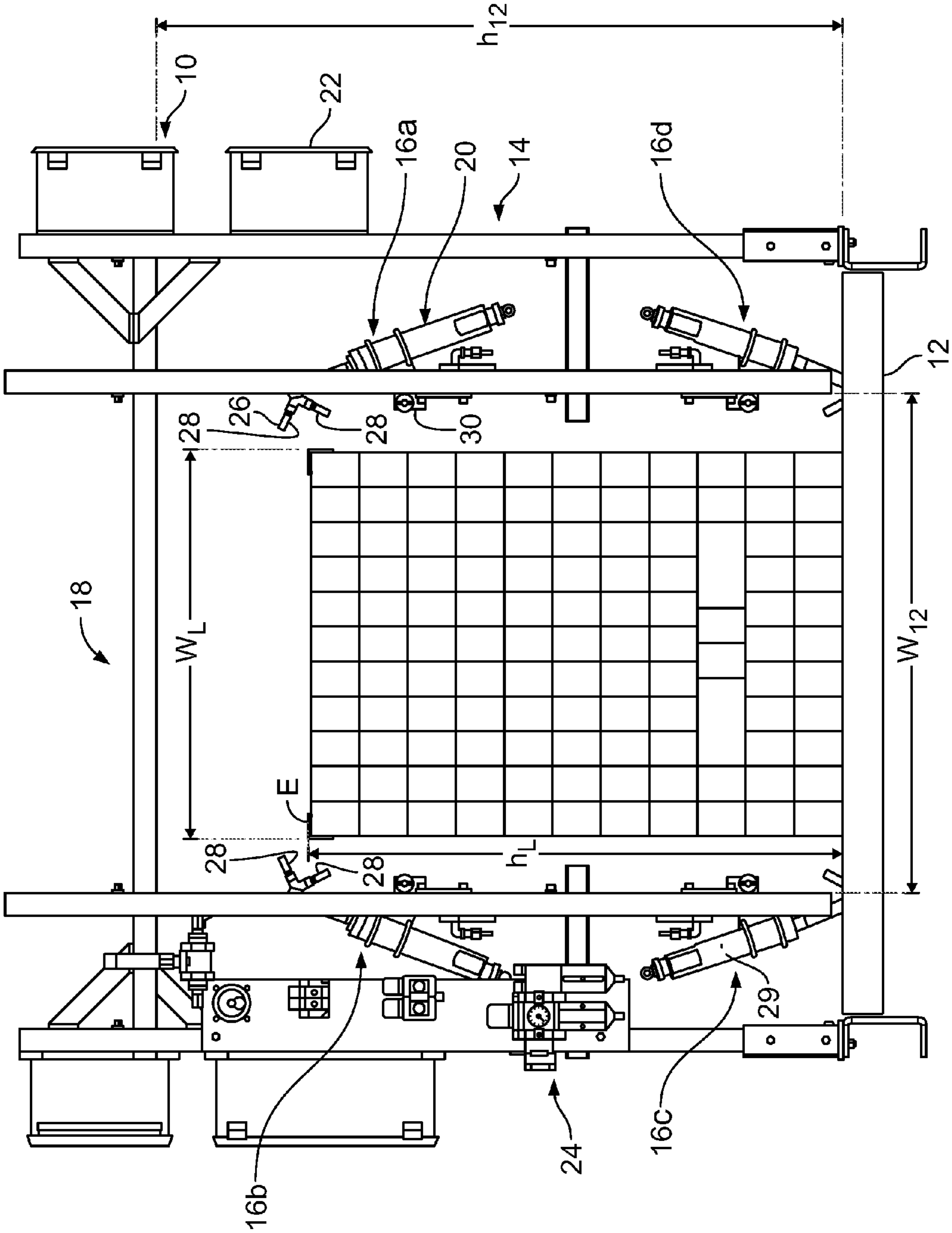
FIG. 2 is a front view of the load in the apparatus of FIG. 1 with the cutting system in the home position.
Figure 3:
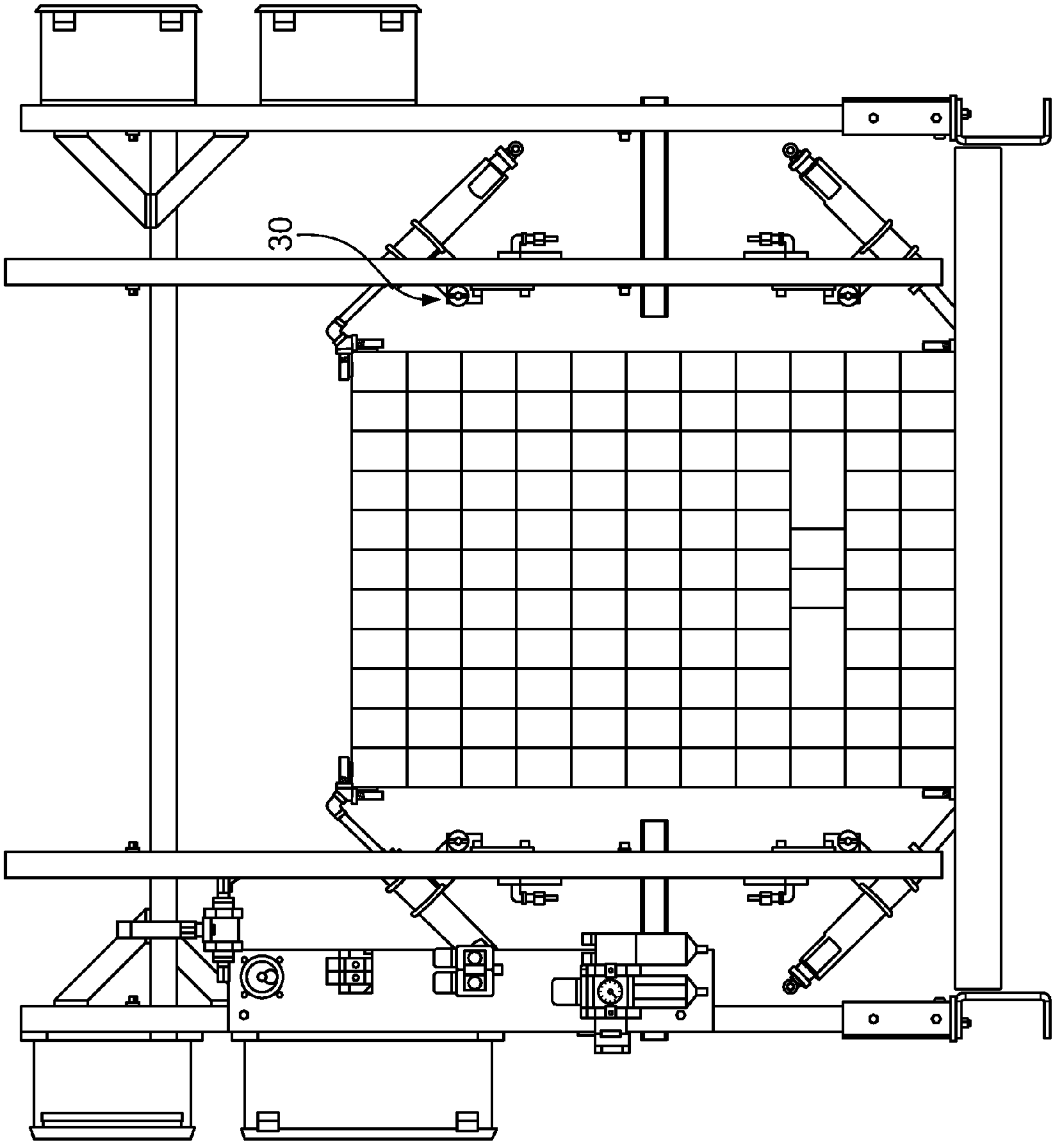
FIG. 3 is a view similar to FIG. 2 with the cutting system in the cutting position.
Figure 4:
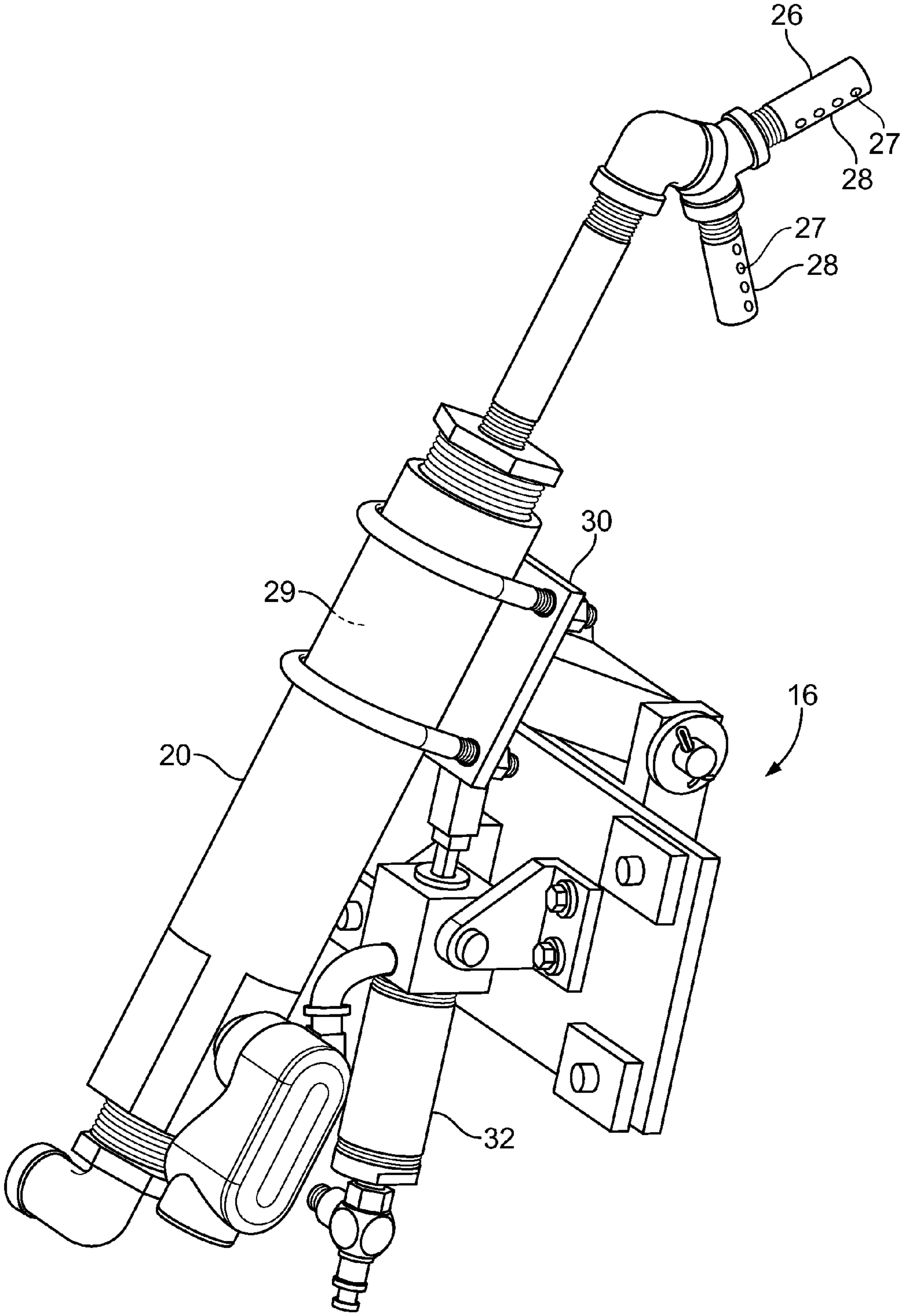
FIG. 4 is a perspective view of a cutting head.
Figure 5:
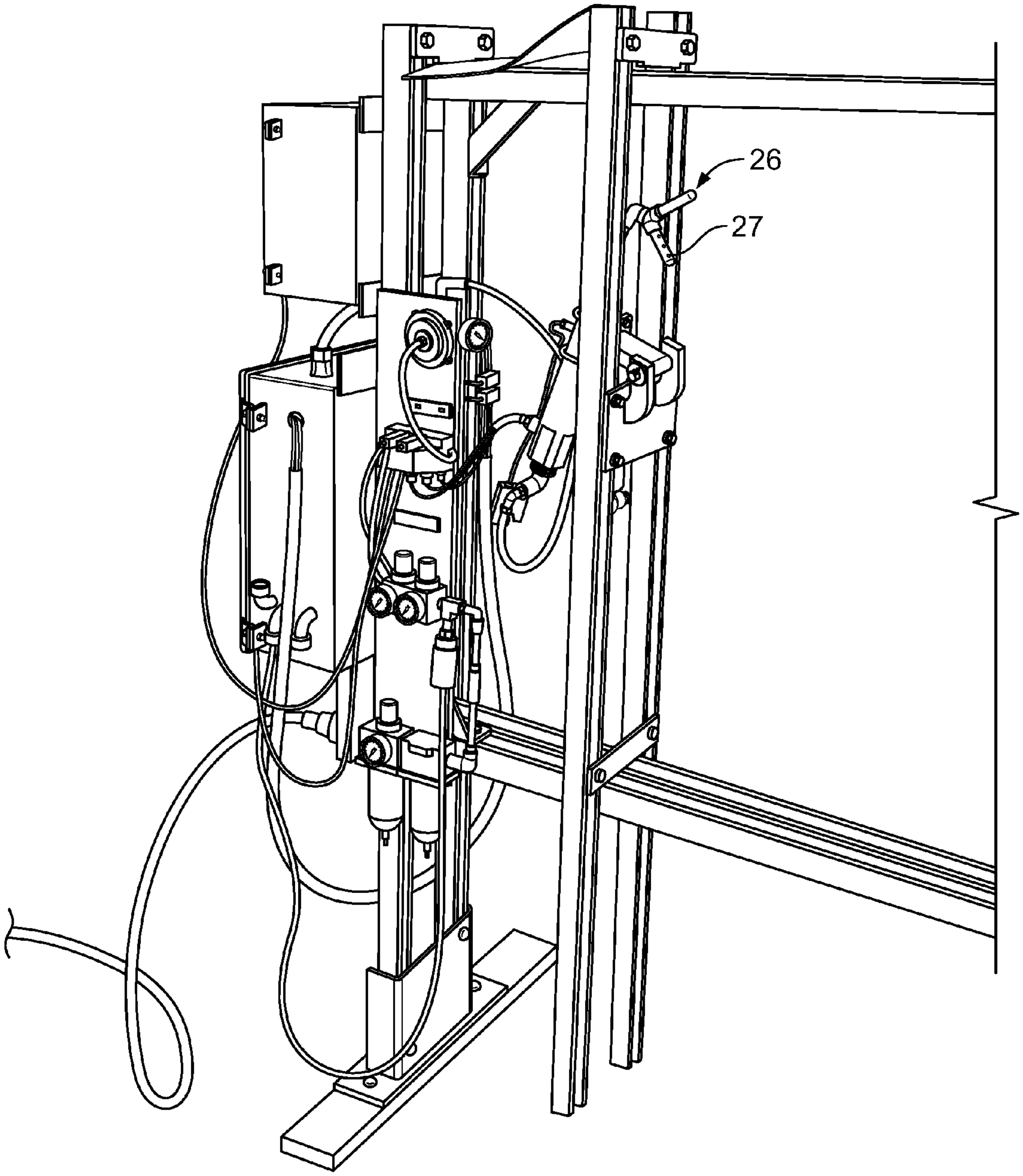
FIG. 5 is a front view of a load of bricks in the bundling apparatus showing an alternate embodiment of the corner edge protector cutting system.

The torches 20 are mounted to the frame 14 on a pivot mount 30. A present cutting head 16 uses a pneumatic cylinder 32 to pivot the torch 20 and nozzle 26 between the home and cutting positions (FIGS. 2 and 3). In the home position (FIG. 2) the cutting heads 16*a-d* are fully pivoted out of the path of the load L and in the cutting position (FIG. 3) the torches 20 and nozzles 26 are pivoted such that the nozzles 26 are within about ½ inch of the edge protector E. When the torches 20 are actuated, the heated air exiting the nozzles 26 cuts the corner protector E (by melting the protector material). The brick or block load section C can then be separated from the load L. In a present cutting system 10, the non-contact cutter 10 cuts the corner protector E without physically contacting or exerting any undue physical force on the corner protector E material. Advantageously, the heat cutting does not significantly, if at all, adversely effect the integrity of the protector E material. In fact, it is believed that eliminating any physical contact cutting will be shown to enhance the structural integrity of the material.

Figure 6:
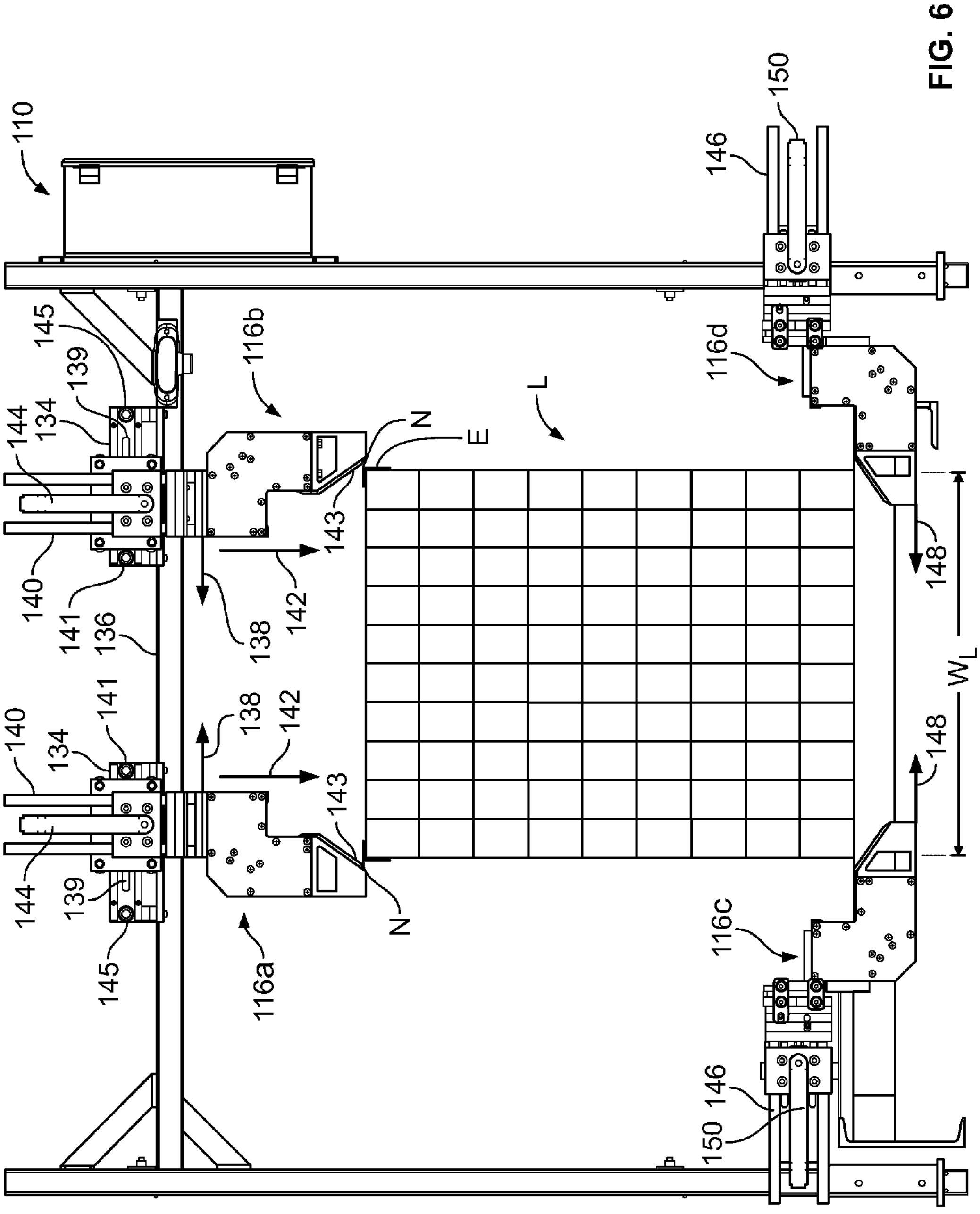
FIG. 6 is a front view of the load in the apparatus of FIG. 5 with the cutting system in the home position.
Figure 7:
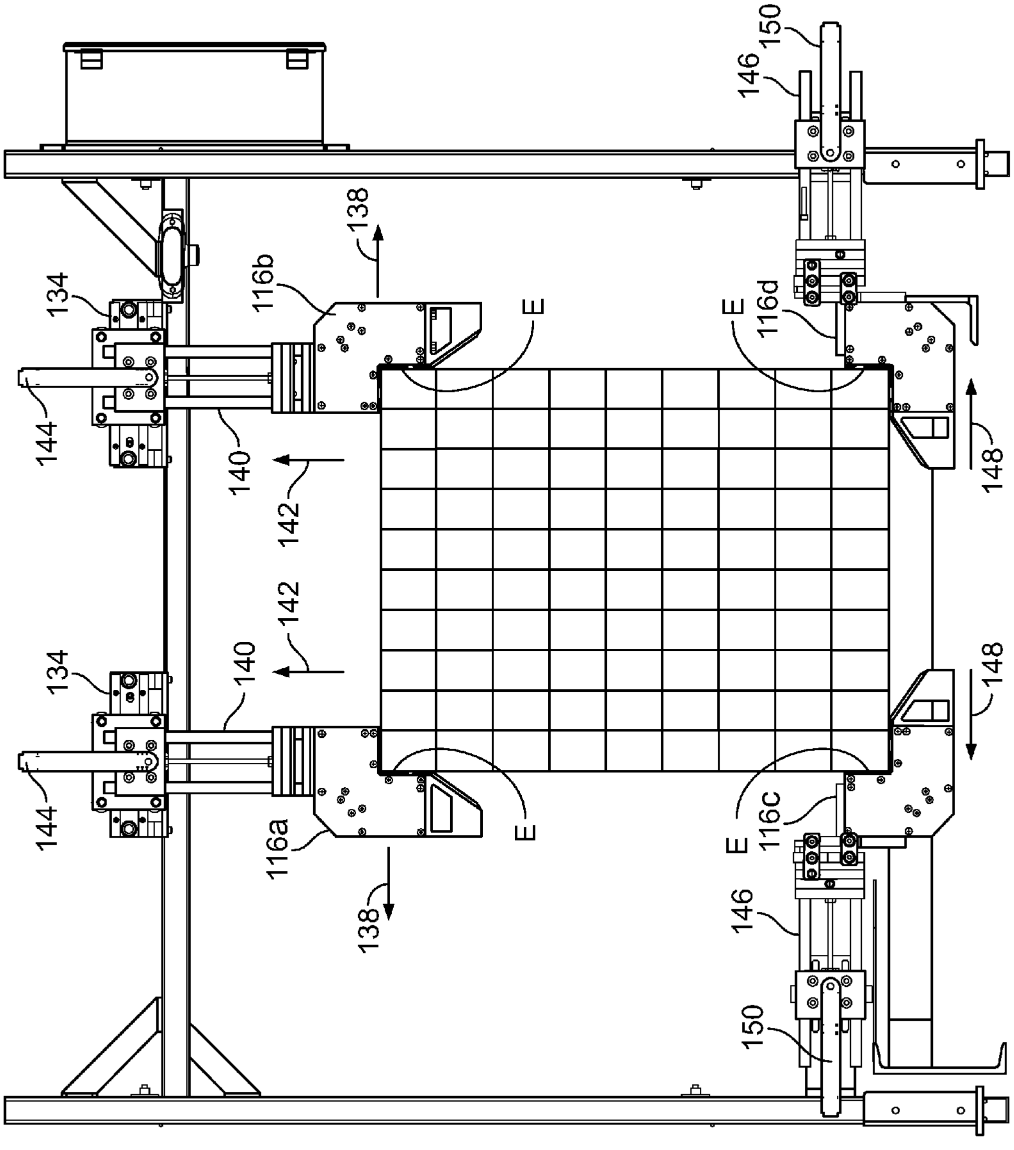
FIG. 7 is a view similar to FIG. 6 with the cutting system in the cutting position.
Figure 8:
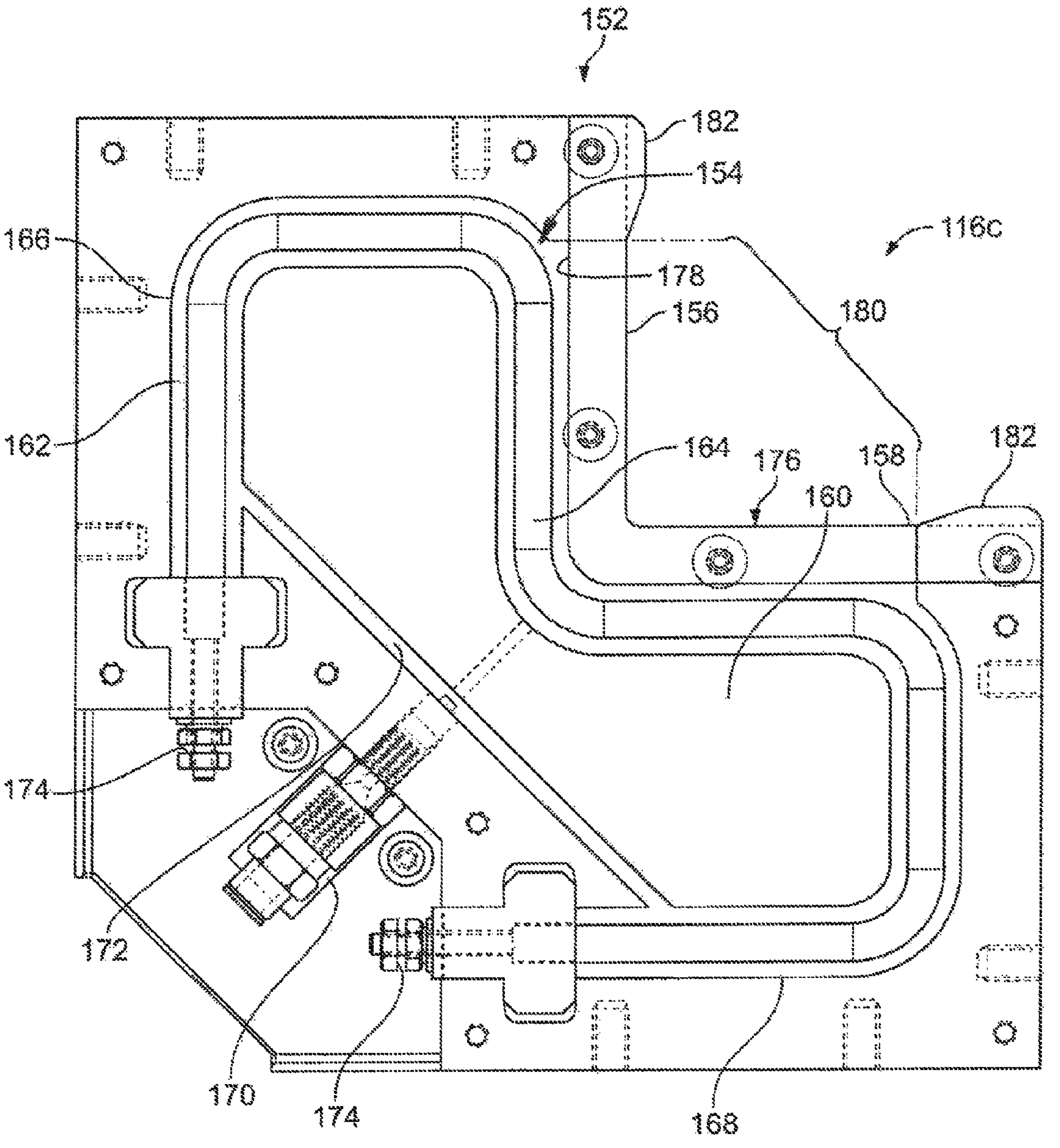
FIG. 8 is a sectional view of the cutting head of the alternate embodiment taken along line 8-8 of FIG. 7.

An alternate embodiment of the cutting system 110 is shown in FIGS. 6-8. In this embodiment 110 the upper cutting heads 116*a-b* are suspended on carriages 134 from an upper beam 136. The carriages 134 move laterally (horizontally, as indicated by the arrow at 138) toward and away from the load L. The carriages 134 are driven by a spring. The carriages 134 are set in an approximate location (since the width $w_L$ of the loads L does not vary greatly). The heads 116*a,b* are set on rollers (not shown) that ride in a track 139 in the carriage 134. The heads are spring (not shown) biased inward, toward the center of the load L. Inward over-travel of the heads 116*a,b* is prevented by bumpers 141 on the carriages. As the heads 116*a,b* move downward (discussed below), a ramped contact surface 143 on the head 116*a,b* contacts the load corner N and urges the head 116*a,b* outward to properly position itself relative to the edge protector E. Outward over-travel of the heads 116*a,b* is also prevented by bumpers 145 positioned on the carriages 134.

The upper heads 116*a,b* are suspended on rails 140 from the carriages 134 to move vertically (up and down, as indicated by the arrow at 142) toward and away from the load L. Vertical movement of the heads 116*a,b* is provided by cylinders 144 mounted to the carriages 134 and the heads 116*a,b.*

The lower heads 116*c,d* are also mounted on rails 146 for horizontal movement (as indicated by the arrow at 148). However, because the lower periphery (bottom) of the load L is at the same height regardless of the size of the load, the heads 116*c,d* only need to be mounted for horizontal movement (e.g., vertical movement is not needed). The heads 116*a,b* are driven, horizontally, by cylinders 150 toward and away from the load L. Spring mountings (not shown) on the lower heads 116*c,d* permit the heads 116*c,d* to move slightly downward in the event that the head 116*c,d* encounter an obstruction.

The upper and lower heads 116 are configured in a similar manner, an exemplary one of which 116*c* is shown in FIG. 8. The head 116 includes an outer housing 152 and inner chamber 154. The housing 152 has an L-shape with a back 156 and leg 158 being about symmetrical. The chamber 154 includes a heating element portion 160 and an air passage 162. A heating element 164 is positioned in the heating element portion 160 and extends into the back 156 and leg 158, extending about the periphery of the outer and inner sides (indicated at 166, 168) of the back 156 and leg 158.

In this embodiment 110, the heating element 164 is an electric element, and specifically, a 350 watt tubular heating element.

The air passage 162 has an inlet nozzle 170 in communication with a cross-flow passage 172 that opens into the heating element portion 160 near the terminal ends 174 of the heating element 164. The air passage 162 then continues through (or with) the heating element portion 160 and opens into a discharge or outlet region 176 at the interior of the L-shape (the inner walls 178 of the back 156 and leg 158). The location of the air passage inlet 170 and outlet 176 and the comingling of the air passage 162 and the heating element portion 160 brings the air into intimate contact with the heating element 164 so as to heat the air. The outlet 176 can be formed as a thin open passage, a series of openings or other discharge configuration. The air exits the discharge at a temperature of about 450° F. The heated air softens the corner protector E material so that the load section C (and protector E material) can be separated from the load L for handling. In this embodiment, the exit opening or passage 176 is a narrow slot 180, having a width of about 10 thousandths of an inch (10 mils) and is positioned about 0.125 (⅛) inches from the corner protector E during operation. The heads 116*a-d* include positioning contacts or bumpers 182 to contact the load L outside the edge protectors E to properly position the heads 116*a-d* for cutting.

It will be appreciated by those skilled in the art that the underlying principle, that is the use of heated gas (e.g., air), is the same in both embodiments of the corner edge protector cutting system 10, 110. In both embodiments, a gas stream (e.g., and air stream) is heated and is expelled via a manifold through a reduced area exit region in the direction of the corner protector E. The exit or discharge 27, 180 is maintained in close proximity to the corner protector E, sufficient to heat the corner protector E to softening, to separate. In this manner the corner protector E is cut or separated without physically contacting the protector E with a bladed cutting tool. Rather, the heated air stream has been found to be effective in promoting the separation of the corner protector E at the load L/section C separation, without adversely affecting the strength or integrity of the corner protector E.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the invention.

What is claimed is:

1. A non-contact cutter for a polymer corner protector disposed on a load, comprising:

an air manifold having an air passage between an inlet and an outlet and defining an air passage; and a heating element disposed at least in part in the air passage, wherein the heating element is configured to heat a compressed gas in the air passage to a temperature greater than or equal to the melting temperature for the polymer and wherein the heated gas is discharged through the outlet to melt the polymer corner protector at a desired location to separate the corner protector at the desired location.

2. The non-contact cutter in accordance with claim 1 including a housing having the heating element disposed therein, the air manifold disposed at least in part in the housing.

3. The non-contact cutter in accordance with claim 2 wherein the housing has a generally L-shaped body having a back and a leg, and the heating element is disposed at least in part in the back and leg, wherein the air passage includes a portion configured to direct air to the back and leg for contact with the heating element.

4. The non-contact cutter in accordance with claim 1 wherein the heater is an electric heater.

5. The non-contact cutter in accordance with claim 1 wherein the heater is a ceramic heater.

6. The non-contact cutter in accordance with claim 1 wherein the cutter is disposed in a head and-wherein the head is movable toward and away from the polymer corner protector.

7. The non-contact cutter in accordance with claim 6 wherein the head is operably mounted to a rail for linear movement toward and away from the corner protector.

8. The non-contact cutter in accordance with claim 6 wherein the head is mounted for pivotal movement toward and away from the corner protector.

9. The non-contact cutter in accordance with claim 7 wherein the head is mounted to a carriage.

10. A non-contact cutter system for a polymer corner protector disposed on a load, the load resting on a horizontally oriented support, the system comprising:

a frame having an upper horizontally oriented rail;

at least one carriage mounted to the rail for horizontal movement along the rail;

a head mounted to each of the at least one carriages for vertical movement toward and away from the carriage, the head including an air manifold having an air passage between an inlet and an outlet, and a heating element disposed at least in part in the air passage, wherein each carriage is movable toward and away from the load and the head is movable toward and away from the carriage, the carriage and head being moved, toward the load to bring the head into proximity to the load and the heating element is configured to heat a compressed gas in the air passage to a temperature greater than or equal to the melting temperature for the polymer, and wherein the heated gas is discharged through the outlet to melt the polymer corner protector at a desired location to separate the corner protector at the desired location.

11. The non-contact cutter system in accordance with claim 10 wherein each head includes a housing having the heating element disposed therein, the air manifold disposed at least in part in the housing.

12. The non-contact cutter system in accordance with claim 11 wherein the housing has a general L-shape having a back and a leg, the heating element disposed at least in part in the back and leg, and wherein the air passage includes a portion configured to direct air to the back and leg for contact with the heating element.

13. The non-contact cutter system in accordance with claim 10 wherein the heater is an electric heater.

14. The non-contact cutter system in accordance with claim 10 wherein the heater is a ceramic heater.

15. The non-contact cutter system in accordance with claim 10 including two carriages, each carriage including a head and including two lower heads, each disposed on opposites sides of the load and at horizontally oriented support.

16. The non-contact cutter system in accordance with claim 15 wherein the lower heads include a housing having a heating element disposed therein, the air manifold disposed at least in part in the housing, and wherein each housing has a generally L-shaped body having a back and a leg, the heating element disposed at least in part in the back and leg, and wherein the air passage includes a portion configured to direct air to the back and leg for contact with the heating element.

17. The non-contact cutter system in accordance with claim 10 wherein the heater is an electric heater.

18. A method for non-contact cutting of a polymer corner protector disposed on a load, comprising:

positioning a non-contact cutter proximal to the polymer corner protector;

directing air through a manifold having an inlet and an outlet and defining an air passage;

heating the air within the manifold to a temperature greater than or equal to the melting temperature for the polymer;

discharging, the heated air from the manifold through the outlet, directing the heated air onto the polymer corner protector at a heated region; and separating the heated polymer corner protector at the heated region.

19. The method in accordance with claim 18 wherein the air is heated by an electric heater.

20. The method in accordance with claim 18 wherein the non-contact cutter is positioned in a head and the head is moved to a position proximal to the corner protector for heating.

* * * * *